United States Patent
Han et al.

(10) Patent No.: US 7,907,238 B2
(45) Date of Patent: Mar. 15, 2011

(54) BACKLIGHT UNIT AND DISPLAY DEVICE USING THE SAME

(75) Inventors: Chul Jong Han, Seoul (KR); Jeong In Han, Seoul (KR)

(73) Assignee: Korea Electronics Technology Institute, Seongnam-si, Gyenggi-do (KR)

( * ) Notice: Subject to any disclaimer, the term of this patent is extended or adjusted under 35 U.S.C. 154(b) by 4 days.

(21) Appl. No.: 12/488,909

(22) Filed: Jun. 22, 2009

(65) Prior Publication Data

US 2010/0265566 A1  Oct. 21, 2010

(30) Foreign Application Priority Data

Apr. 17, 2009  (KR) ............... 10-2009-0033841

(51) Int. Cl.
G02F 1/1335 (2006.01)
G02F 1/167 (2006.01)
G09F 13/04 (2006.01)

(52) U.S. Cl. ............ 349/113; 349/2; 349/3; 349/62; 349/70; 359/296; 362/97.1

(58) Field of Classification Search .......... 349/2, 3, 349/29, 62, 70, 113; 385/129, 130, 131, 385/134, 14, 147; 362/97.1, 97.2; 359/296
See application file for complete search history.

(56) References Cited

U.S. PATENT DOCUMENTS

| 7,307,779 | B1 * | 12/2007 | Cernasov ............... 359/296 |
| 2003/0095401 | A1 * | 5/2003 | Hanson et al. ............ 362/84 |
| 2004/0108048 | A1 * | 6/2004 | Nakakuki et al. ......... 156/230 |
| 2006/0139301 | A1 * | 6/2006 | Ryu et al. ............... 345/102 |
| 2008/0298083 | A1 * | 12/2008 | Watson et al. ........... 362/603 |
| 2010/0265566 | A1 * | 10/2010 | Han et al. .............. 359/296 |

* cited by examiner

Primary Examiner — Brian M Healy
(74) Attorney, Agent, or Firm — Ohlandt, Greeley, Ruggiero & Perle, L.L.P.

(57) ABSTRACT

An ultra-thin edge-type backlight unit allowing a local dimming driving and a scanning driving and using a low-cost light source, and a display device of excellent screen quality are provided. The backlight unit includes a light guide plate, a light source disposed in a side of the light guide plate and a reflective-type display panel disposed on an opposite side of a surface where a light radiated from the light source is extracted.

11 Claims, 10 Drawing Sheets

430-1

430-2

430-3

630-2

632

630-4

634

700

BACKLIGHT UNIT AND DISPLAY DEVICE USING THE SAME

PRIORITY

This application claims the benefit under 35 U.S.C. §119 (a) to a Korean patent application filed in the Korean Intellectual Property Office on Apr. 17, 2009 and assigned Serial No. 2009-33841, the entire disclosure of which is hereby incorporated by reference.

BACKGROUND OF THE INVENTION

1. Field of the Invention

The present invention relates generally to a backlight unit and a display device using the same. More particularly, the present invention relates to an ultra-thin edge-type backlight unit allowing a local dimming driving and a scanning driving and using a low-cost light source, and a small display device of excellent screen quality.

2. Description of the Related Art

Flat display devices include Liquid Crystal Display (LCD), Plasma Display Panel (PDP), Organic Light Emitting Diode (OLED), Field Emission Display (FED), and so on. The PDP, the OLED, and the FED, which illuminates by itself, do not require a separate light source, whereas the LCD necessitates an external light source because it cannot illuminate by itself.

The LCD is widely used as a display device of mobile phones, handheld game consoles, Personal Digital Assistants (PDAs), monitors, and TVs. The Thin Film Transistor (TFT)-LED, which is the most common display module, cannot illuminate by itself and thus requires the use of a backlight. The TFT-LED functions as an optical shutter and represents pixel information using the backlight which supplies the uniform surface light from the rear.

Since the TFT-LCD uses the optical shutter in the front while illuminating the whole backlight, it has drawbacks compared to the Cathode Ray Tube (CRT), PDP, or the OLED that illuminate on a pixel basis by itself. The drawbacks include Contrast Ratio (C/R) decrease, energy consumption increase, and afterimages. To address those shortcomings, a local dimming technique which partially switches on and off the backlight, which was the uniform flat light source, is introduced.

However, the local dimming technique has been developed primarily in the backlight unit of the direct-type light source. That is, the local dimming using the partially flickering light source can be implemented only in the backlight including the direct-type light source. As for the direct-type backlight unit including a plurality of light sources in the back side of the panel, a housing of the light source is more complicated than that of an edge type and the uniform luminance requires a certain interval between the light source and the panel. Naturally, the direct-type backlight unit of the display device aiming at the miniature size and the ultra thickness is much thicker than the edge-type backlight unit.

Thus, what is needed is a backlight unit for reducing the thickness of the display device and realizing the local dimming technique.

SUMMARY OF THE INVENTION

An aspect of the present invention is to address at least the above mentioned problems and/or disadvantages and to provide at least the advantages described below. Accordingly, an aspect of the present invention is to provide an ultra-thin edge-type backlight unit allowing a local dimming driving and a scanning driving and using a low-cost light source, and a small display device of excellent screen quality.

According to one aspect of the present invention, a backlight unit includes a light guide plate; a light source disposed in a side of the light guide plate; and a reflective-type display panel disposed on an opposite side of a surface where a light radiated from the light source is extracted.

A resolution of the reflective-type display panel may be equal to or more than 2×2. The reflective-type display panel may be a toner type electronic paper. The toner type electronic paper may include white toner particles and black toner particles.

The light source may use at least one of a Cold Cathode Fluorescent Lamp (CCFL), an External Electrode Fluorescent Lamp (EEFL), and a Light Emitting Diode (LED).

According to another aspect of the present invention, a display device includes a backlight unit; and a transmissive-type display panel disposed in a surface where a light is extracted.

A resolution of the reflective-type display panel may be equal to a resolution of the transmissive-type display panel. A response time of the reflective-type display panel may be equal to or faster than a response time of the transmissive-type display panel.

The display device allows the scanning driving using the backlight unit by regulating the driving of the reflective display. At least one of a diffuser plate and a prism sheet may be disposed between a light guide plate and the transmissive-type display panel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
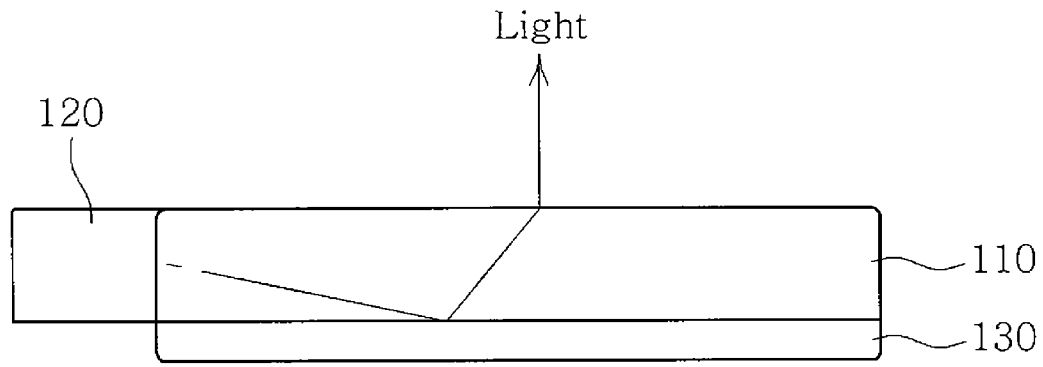
FIG. 1 is a sectional view of a backlight unit according to an exemplary embodiment of the present invention.

FIG. 1 is a sectional view of a backlight unit according to an exemplary embodiment of the present invention. The backlight unit 100 includes a light guide plate 110, a light source 120 disposed in a side of the light guide plate 110, and a reflective-type display panel 130 disposed in the opposite side of a surface where the light emitted from the light source is extracted.

According to an exemplary embodiment of the present invention, the backlight unit 100, which is an edge-type backlight unit, includes the light guide plate 110 for guiding the light emitting from the light source 120. The light guide plate 110 guides the light radiated from the side to the upper side like the light emitted from a surface light source. In detail, the light originating from the light source 120 disposed in the side of the light guide plate 110 is reflected inside the light guide plate 110 along the light guide plate 110 in zigzags, and part of the light is reflected in a diffusion pattern of the light guide plate 110 and extracted upward.

Since the light guide plate 110 is used in the display device, it employs a transparent resin in the visible ray area. For example, the light guide plate 110 can employ a transparent acrylic resin.

The light source 120 is disposed in the side of the light guide plate 110. Since the backlight unit 100 of the present invention is the edge-type backlight unit, the light source 120 is positioned in the side of the light guide plate 110. The light source 120 can employ one or two or more of a Cold Cathode Fluorescent Lamp (CCFL), an External Electrode Fluorescent Lamp (EEFL), and a Light Emitting Diode (LED).

The light source 120 used in the backlight unit 100 can employ not only the LED allowing the local dimming but also the CCFL or the EEFL. This is because the backlight unit 100 of the present invention makes use of the reflective-type display panel 130 under the light guide plate 110 for the sake of the local dimming. Accordingly, the light source 120 can use any light source which can be placed in the side of the light guide plate 110. The light source 120 can use the light sources of one type, or various types if necessary.

The light source 120 can be disposed in two or more sides, as well as one side of the light guide plate 110. When the light source is present only in one side, the light may not be effectively extracted in the light guide plate region far away from the light source 120. In result, it is hard to attain the uniform luminance throughput the display device. When the light guide plate 110 is disposed in one or more sides, the light guided through the light guide plate 110 can be mixed or extracted more effectively.

Referring to FIG. 1, the reflective-type display panel 130 is disposed in the rear of the light guide plate 110. The reflective-type display panel 130 is positioned in the opposite side of the surface where the light radiated from the light source 120 is extracted.

The reflective-type display panel 130 produces the light by modulating the ambient light projected to the screen and reflecting the light on a surface like a mirror. For the modulation, the reflective-type display panel 130 can utilize a liquid crystal mixture or an electrophoretic mixture. The reflective-type display panel 130 was developed to address the shortcomings of a transmissive-type display panel and an emissive display panel. Major defects of the transmissive-type display panel include the legibility depreciation in the bright environment and the non-self light radiation which necessitates the backlight unit. The emissive display panel mainly requires the high power consumption to continuously illuminate the self-light emitting organic material. By contrast, the reflective-type display panel 130 features the low power consumption by efficiently utilizing the ambient light.

The reflective-type display panel 130 can employ any kinds of the reflective-type display panel. In this embodiment of the present invention, note that the reflective-type display panel 130 is not the display panel per se but is used as an auxiliary display panel for the local dimming of the transmissive-type display panel. The reflective-type display panel 130, not limited to particular types, can employ any display panel having a response time equal to or shorter than the response time of the transmissive-type display panel. For example, the response time of the reflective-type display panel 130 can be 8 msec.

A resolution of the reflective-type display panel 130 can be determined by the intended local dimming scheme. Preferably, the resolution of the reflective-type display panel 130 is equal to or similar to the resolution of the transmissive-type display panel.

Preferably, the reflective-type display panel 130 is an electronic paper of a simpler structure and a lower cost than the reflective-type display panel 130 including the liquid crystal mixture. As stated earlier, since the reflective-type display panel 130 is not the component for displaying data, it can sufficiently represent on/off of the light source even using the simple electronic paper including white and black toner particles. The electronic paper using the white and black toner particles shall be further described in FIG. 5.

Figure 2:
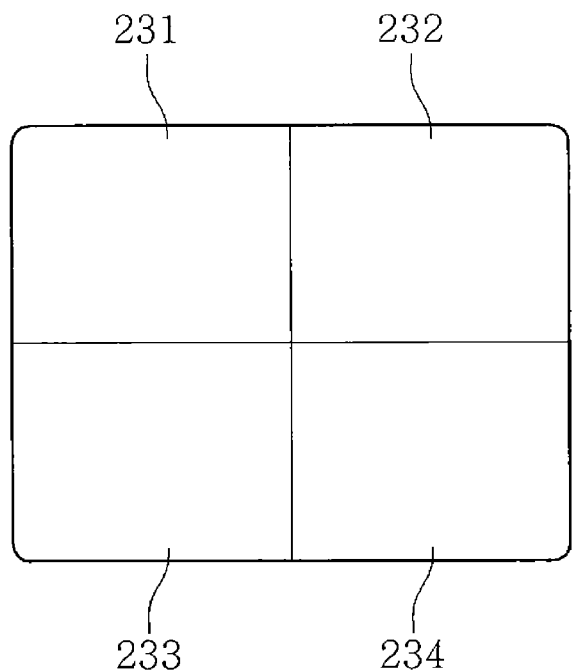
FIG. 2 is a plane view of a reflective-type display panel according to an exemplary embodiment of the present invention.

FIG. 2 is a plane view of the reflective-type display panel according to an exemplary embodiment of the present invention. The resolution of the reflective-type display panel 230 can be 2×2 as shown in FIG. 2. The reflective-type display panel 230 includes a first cell 231, a second cell 232, a third cell 233, and a fourth cell 234. The cells 231 through 234 are driven individually. Hence, the cells 231 through 234 are switched on and off according to the intended driving scheme. The driving of the cells 231 and 234 is described in more detail by referring to FIGS. 3A through 3D.

FIGS. 3A through 3D show on and off states per cell of the reflective-type display panel having the resolution of 2×2 as in the reflective-type display panel of FIG. 2. The reflective-type display panel includes a first cell 331, a second cell 332, a third cell 333, and a fourth cell 334. The cells 331 through 334 are driven individually.

Figure 3A:
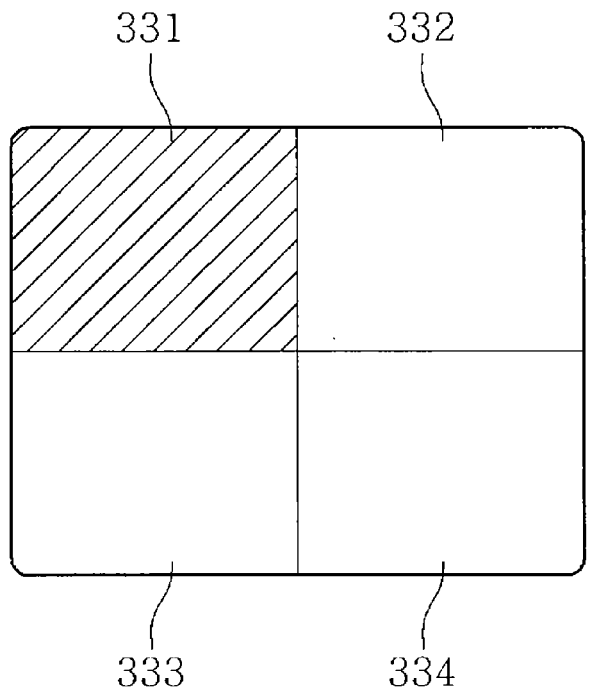
FIGS. 3A through 3D are diagrams of the reflective-type display panel of FIG. 2 switched on and off per cell.
Figure 3B:
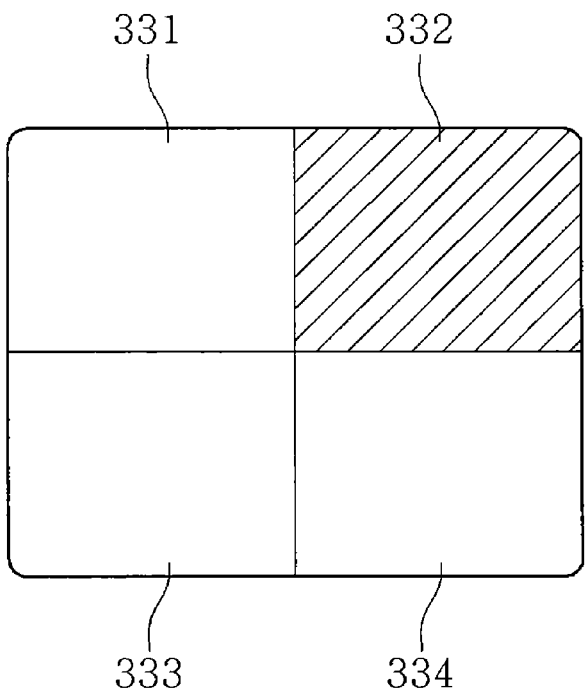
Figure 3C:
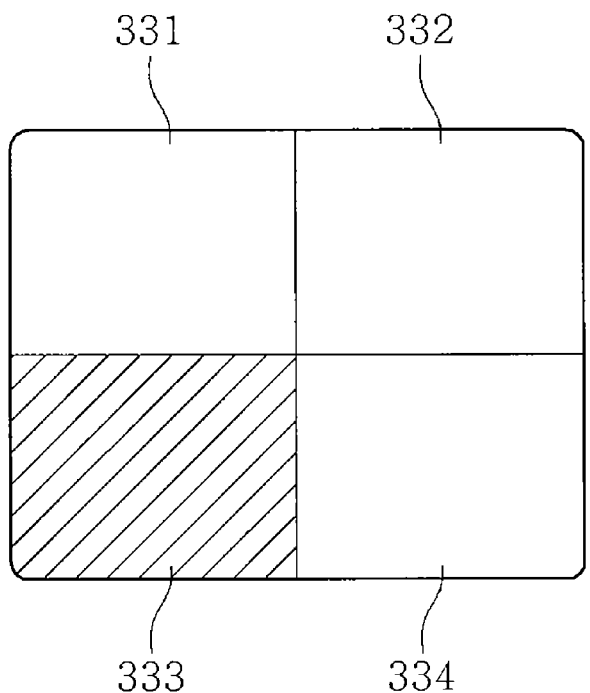
Figure 3D:
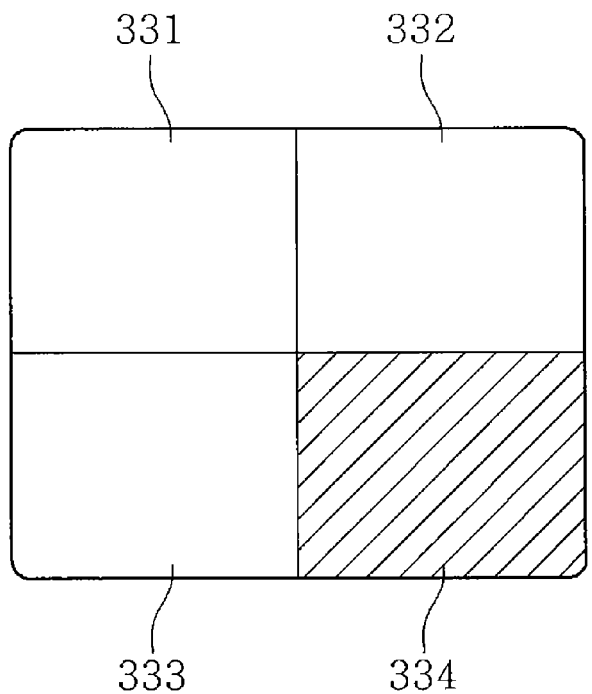

In FIG. 3A, the reflective-type display panel 330-1 switches off the first cell 331 and switches on all of the second cell 332, the third cell 333, and the fourth cell 334. Hence, the backlight unit including the reflective-type display panel will backlight with part of it switched off. Similarly, the reflective-type display panel 330-2 switches off the second cell 332 in FIG. 3B, switches off the third cell 333-3 in FIG. 3C, and switches off the fourth cell 334-4 in FIG. 3D. While the reflective-type display panel of FIGS. 3A through 3D includes four cells and switches off only one of the cells, one skill in the art can appreciate that the reflective-type display panel adopts any on/off style, for example, by switching off all, three, or two of the cells.

Figure 4A:
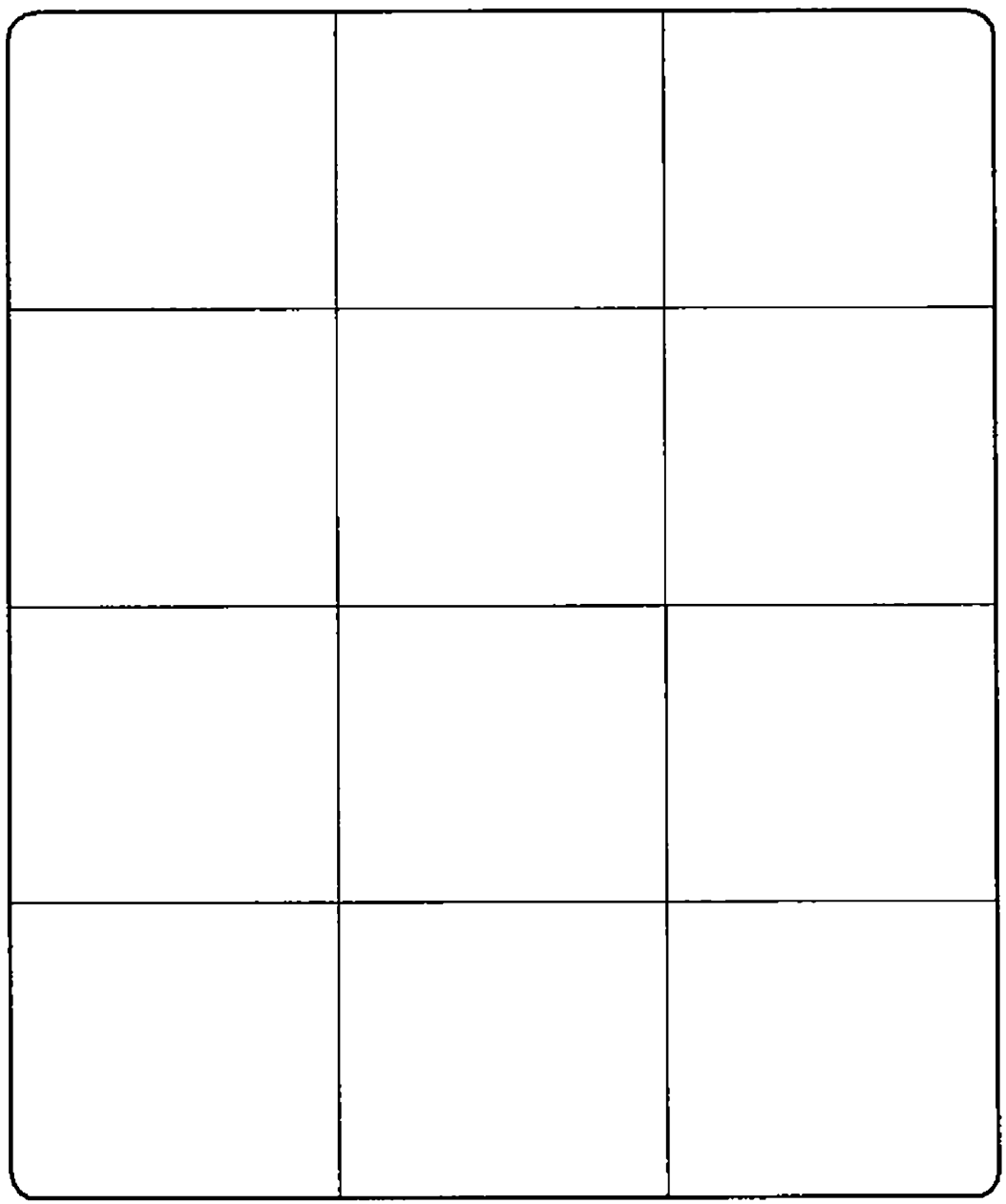
FIGS. 4A, 4B and 4C are diagrams of a reflective-type display panel having a higher resolution than the reflective-type display panel of FIG. 2, which is switched on and off per cell.
Figure 4B:
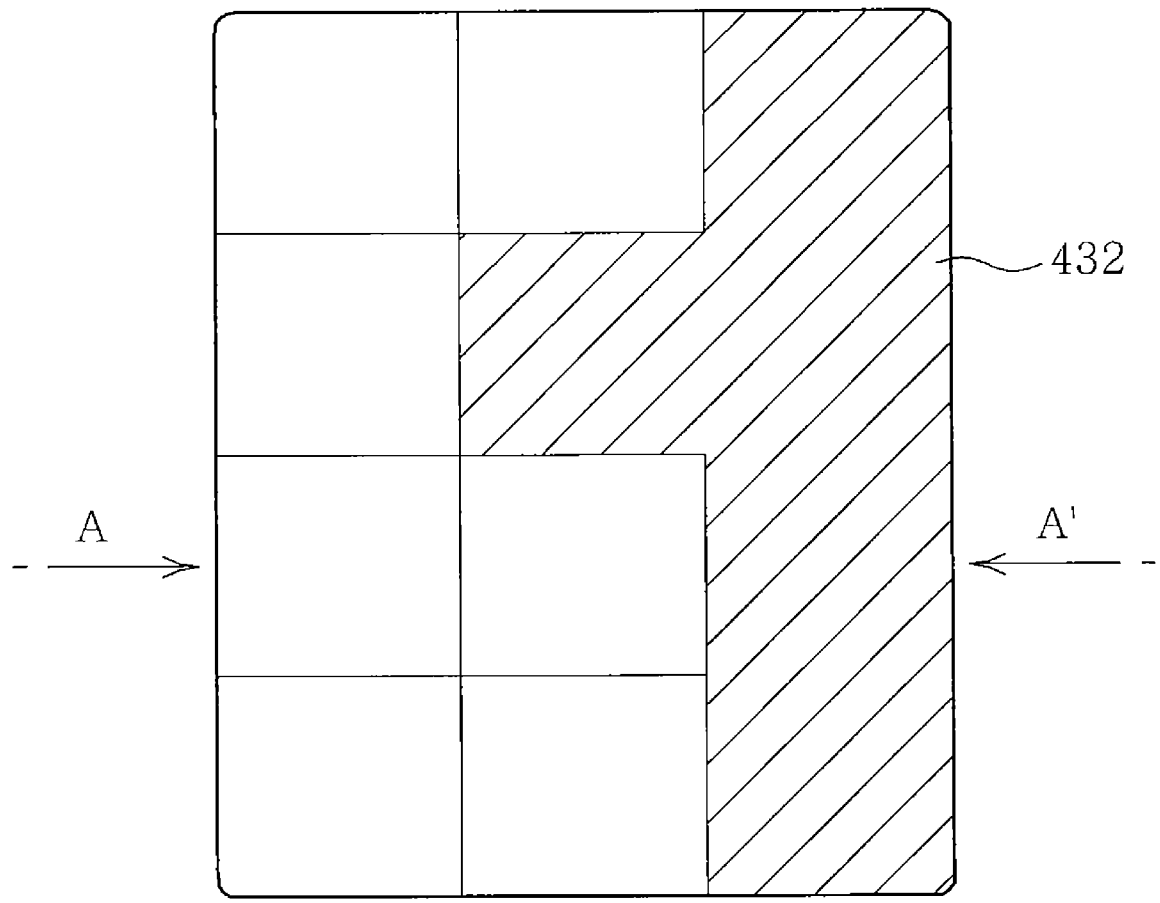
Figure 4C:
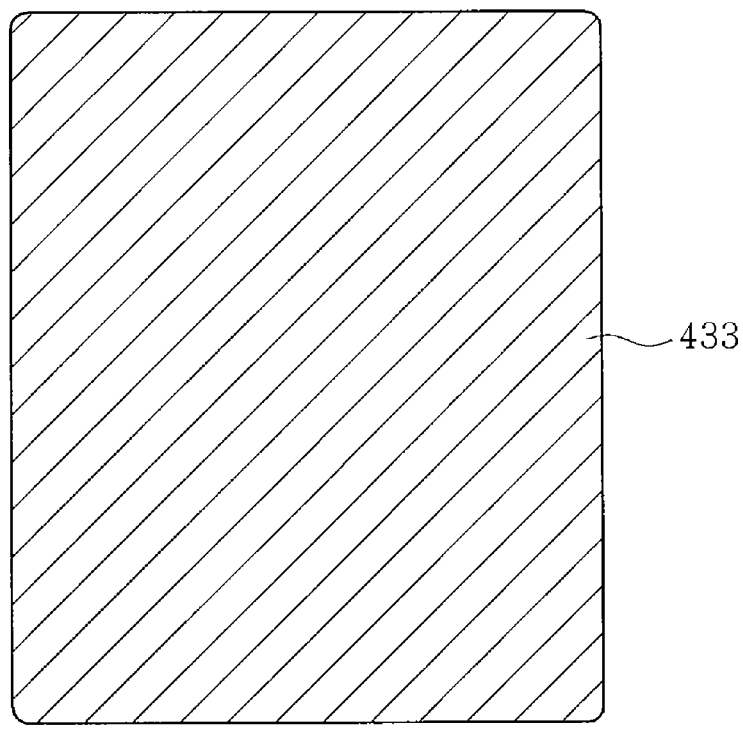

FIGS. 4A, 4B and 4C show a reflective-type display panel having a higher resolution than the reflective-type display panel of FIG. 2, which is switched on and off per cell. As the resolution of the reflective-type display panel increases, the local dimming effect increases but the manufacture cost or the fabrication complexity increases. That is, when the resolution of the reflective-type display panel is equal to or higher than that of the transmissive-type display panel, the reflective-type display panel can be controlled to make it similar to data represented in the transmissive-type display panel. Thus, the excellent local dimming can be accomplished.

In FIG. 4A, the reflective-type display panel 430-1 are split into 12 cells. All of the cells are switched on. When every cell is switched on, the light from the light source (not shown) of the backlight unit is extracted through the light guide plate.

In the reflective-type display panel 430-2 of FIG. 4B, part of the cells are switched off. The region of the cells switched off in FIG. 4A is referred to as an off-cell region 432. The shape of the off-cell region can be set by the intended local dimming scheme. For example, relative to the reflective-type display panel 330-2 of FIG. 3B, the shape of the off-cell region of FIG. 4B can be various and the local dimming can be achieved more effectively.

As every cell of the reflective-type display panel 430-3 of FIG. 4C is switched off, the off-cell region 433 occupies the entire region of the reflective-type display panel 430-3. Accordingly, the backlight unit including the reflective-type display panel 430-3 of FIG. 4C does not backlight. Such a reflective-type display panel 430-3 can be used as a black screen inserted to remove the afterimages of the transmissive-type display panel. Yet, while this black screen can be effective in removing the afterimages, the longer insertion time of the black screen may disadvantageously decrease the luminance of the backlight. In this respect, the reflective-type display panel applying the scanning backlight scheme which can avoid the luminance decrease of the backlight and remove the afterimages shall be illustrated by referring to FIGS. 6A through 6D.

Figure 5:
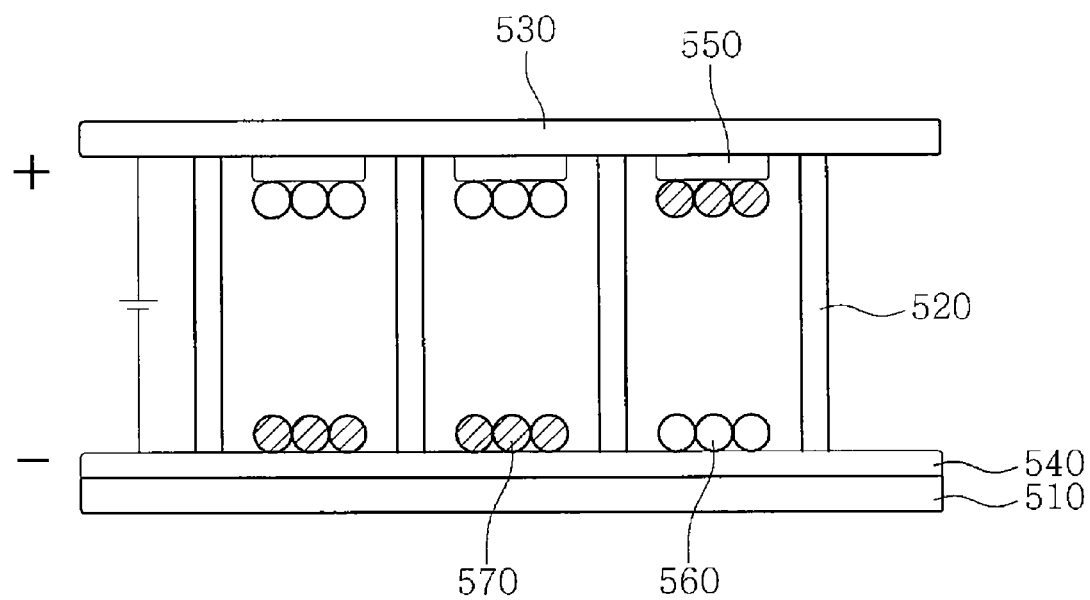
FIG. 5 is a sectional view of FIG. 4B, which is taken along A-A'.

FIG. 5 is a sectional view of FIG. 4B, which is taken along A-A'. The reflective-type display panel 430-2 can be the toner type electronic paper. Particularly, the electronic paper can use white toner particles 560 and black toner particles 570. The black and white electronic paper of FIG. 5 includes an upper plate 530, a lower plate 510, transparent upper and lower electrodes 550 and 540 which apply the driving voltage of the element between the upper plate 530 and the lower plate 510, partitions 520 for separating the cells, and white charged particles 560 and black charged particles 570 between the two electrodes 550 and 540. The white charged particles 560 are the negatively (−) charged particles, and the black charged particles 570 are the positively (+) charged particles.

Referring to FIG. 5, the toner particles can be located when the voltage is applied to the black and white electronic paper. When the voltage is applied to the first cell and the second cell, the upper electrode 550 is positive (+) and the lower electrode 540 is negative (−). When the voltage is applied to the third cell, the upper electrode 550 is negative (−) and the lower electrode 540 is positive (+). In the first cell and the second cell, the negative (−) white charged particles 560 move to the positive (+) upper electrode 550 and the positive (+) black charged particles 570 move to the negative (−) lower electrode 540. In the third cell, the negative (−) white charged particles 560 move to the positive (+) lower electrode 540.

Consequently, in the upper view, the first cell and the second cell represent the white and the third cell represents the black, to thus form the shape as indicated by A-A' of FIG. 4B.

FIGS. 6A through 6D show the reflective-type display panel of FIG. 4A switched on and off per cell. The reflective-type display panels of FIGS. 6A through 6D demonstrate the application of the scanning driving technique to the backlight unit of the present invention.

In case of an impulse type display device, for example, CRT or plasma TV, the screen is represented in the impulse form and the on state of the screen is momentary, and the previous frame disappears before the next frame is transferred because the interval between the on state and the off state is ensured. Thus, the impulse type display device less suffers from the visual afterimages, the image superimposition, and the image trembles. By contrast, the transmissive-type display panel, for example, the hold type display device of the liquid crystal display device takes more time to represent the frame in the screen than the impulse type display device and suffers from the afterimages or the image trembles caused by the superimposition with the adjacent frame when the response time is long.

Figure 6A:
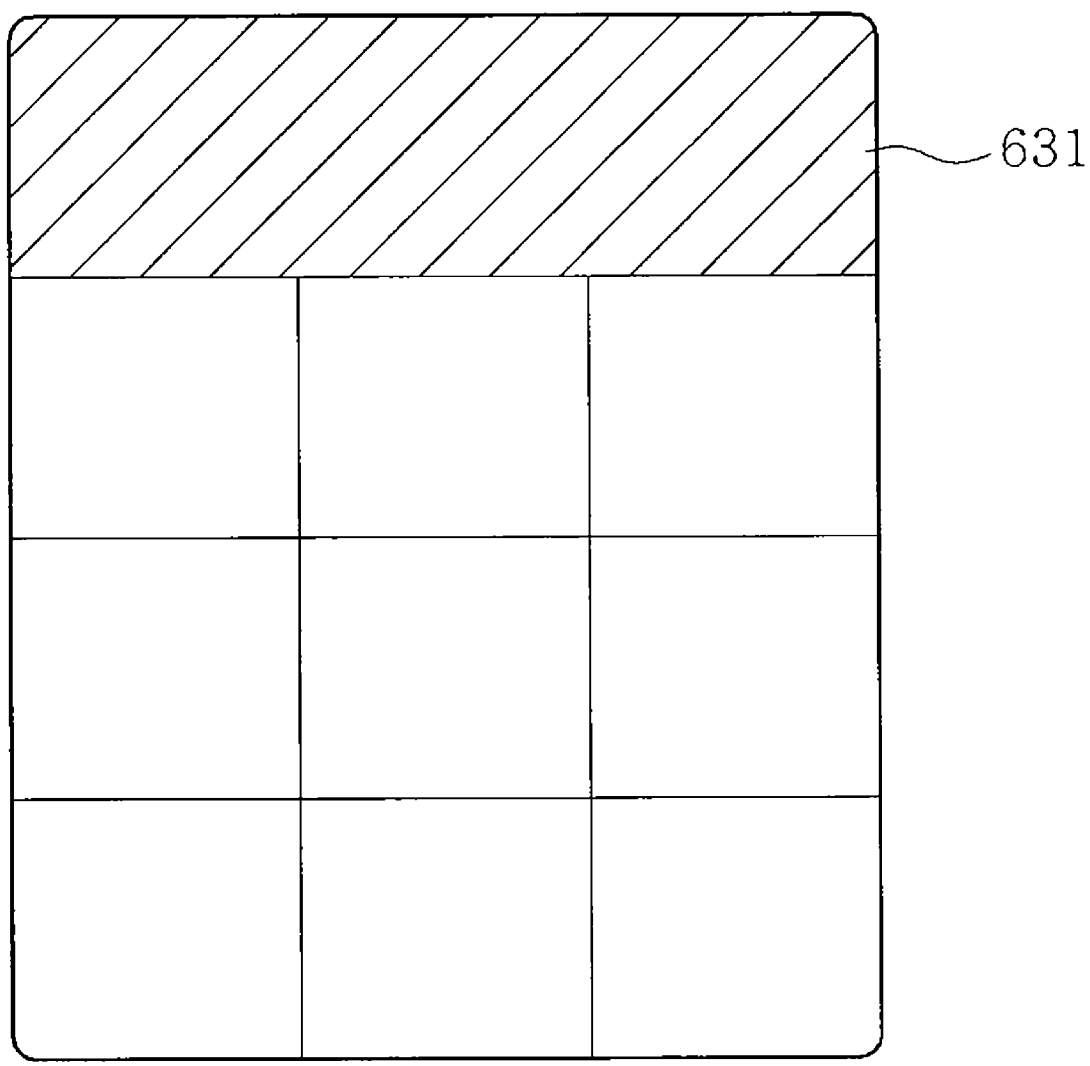
FIGS. 6A through 6D are diagrams of the reflective-type display panel of FIG. 4A switched on and off per cell.
Figure 6B:
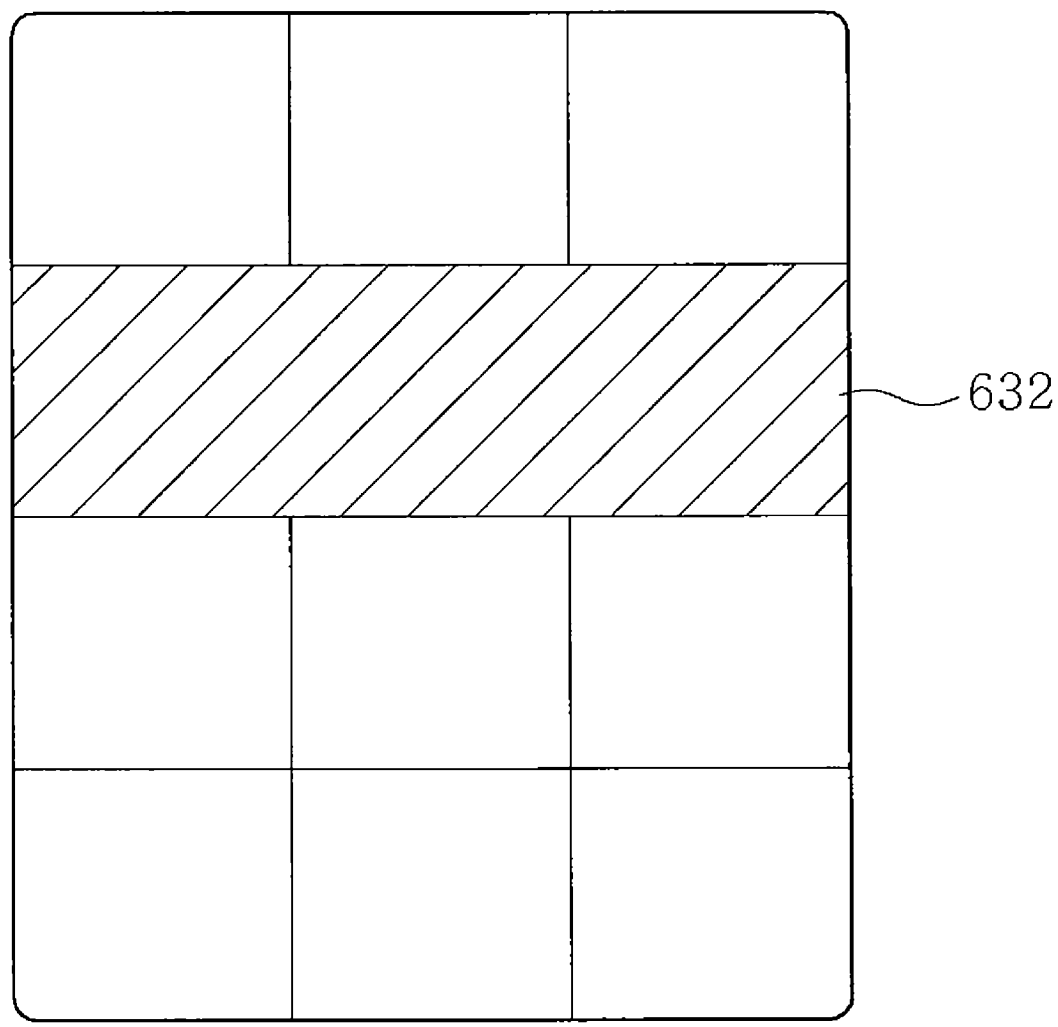
Figure 6C:
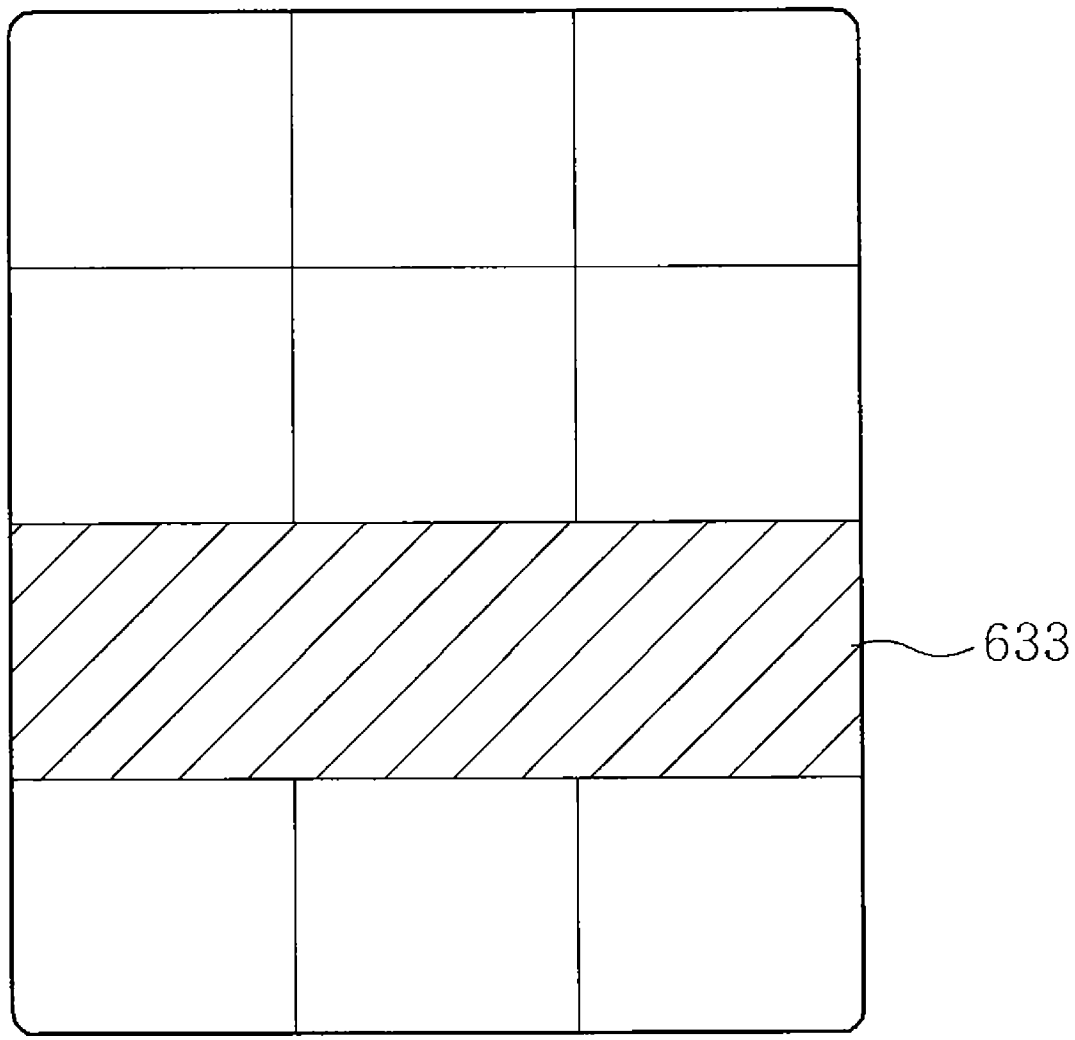
Figure 6D:
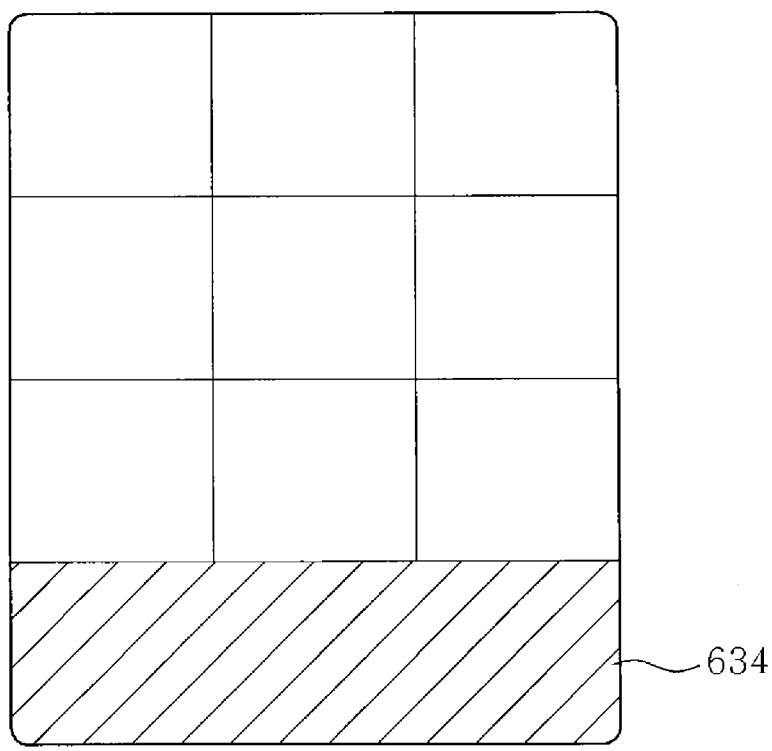

To prevent those drawbacks, the scanning scheme or the blinking scheme of FIGS. 6A through 6D can be used. In the reflective-type display panel 630-1 of FIG. 6A, the uppermost three cells 631 are switched off. In the reflective-type display panel 630-2 of FIG. 6B, the three cells 632 of the next row are switched off. In FIG. 6C, the three cells 633 of the next row are switched off. Finally, the three cells 634 of the last row are switched off. By sequentially switching off the cells per row, the afterimages caused by the response time can be removed. This scheme can prevent the luminance reduction and block the flickering, compared to the entirely black screen of FIG. 4C.

While the cells are sequentially switched off per row in FIGS. 6A through 6D, the cells of two rows can be switched off, the cells of the other two rows can be switched on, and then the on/off states can be reversed to thus achieve the effect of the scanning driving. One skilled in the art will appreciate various embodiments which yield the same effect by properly adjusting the on/off state of the cells.

Figure 7:
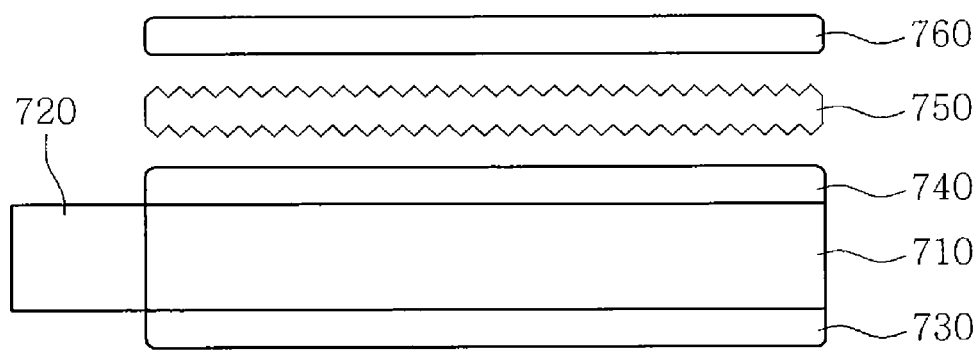
FIG. 7 is a sectional view of a display device including the backlight unit according to an exemplary embodiment of the present invention.

FIG. 7 is a sectional view of the display device 700 including the backlight unit according to an exemplary embodiment of the present invention. The display device 700 includes a light guide plate 710, a light source 720 disposed in the side of the light guide plate 710, a backlight unit including a reflective-type display panel 730 disposed in the opposite side of the surface where the light radiated from the light source 720 is extracted, and a transmissive-type display panel 760 disposed in the surface where the light is extracted. The light guide plate 710, the light source 720, and the reflective-type display panel 730 have been explained in FIG. 1 and thus their descriptions shall be omitted here.

The display device 700 uses the reflective-type display panel 730 as a local dimming driving apparatus. The reflective-type display panel 730 is positioned on the opposite side of the transmissive-type display panel 760 represented in the screen based on the light guide plate 710. A reflective plate for extracting the light is disposed under the light guide plate 710. Since the reflective-type display panel 730 lies under the light guide plate 710 in the backlight unit of the present invention, the separate reflective plate is unnecessary. The reflective-type display panel 730 can be driven by applying the same image signal as the transmissive-type display panel 760.

The light radiated from the light source 720 arrives at the transmissive-type display panel 760 via the light guide plate 710. To effectively extract the light or to achieve the uniformity of the luminance and the uniform mixture of the light over the surface of the transmissive-type display panel 760, a diffusing material can be interposed between the light guide plate 710 and the transmissive-type display panel 760. At least one of a diffuser plate 740 for diffusing the light emitted from the light guide plate 710 upward and a prism sheet 750 for increasing the luminance of the front side of the display device 700 can be provided.

The display device 700 of the present invention includes both of the transmissive-type display panel 760 and the reflective-type display panel 730. Correspondingly, when the transmissive-type display panel 760 backlights, the reflective-type display panel 730 can function as not only the apparatus for the local dimming but also one independent display panel. More specifically, the transmissive-type display panel 760 may degrade the legibility in the bright environment, for example, during the day under the high intensity of the radiation. Even when only the reflective-type display panel 760 is driven or both panels are driven, the more vivid images can be represented using the reflective-type display panel 730. In the night with the little intensity of the radiation, the transmissive-type display panel 760 can be mainly used and the reflective-type display panel 730 can be used for the local dimming.

For doing so, the display device 700 can include a controller for controlling the transmissive-type display panel 760 and a controller for controlling the reflective-type display panel 730, and utilize the controllers together or separately.

As set forth above, by using the reflective-type display panel as the reflector of the backlight unit, the ultra-slim edge-type backlight unit allowing the local dimming can be realized. Using the low-cost light source such as CCFL or EEFL which had difficulty in applying to the LED and the thin direct-type backlight unit, the manufacture cost can be reduced.

In addition, since the display device having the high contrast ratio can be implemented through the local dimming, the visibility and the legibility of not only the large-scale TVs but also small portable devices such as mobile phones and navigation devices for vehicle can be increased.

When the reflective-type display panel is used in the backlight unit, the local dimming and the scanning driving are feasible. Thus, by removing the afterimages of the video caused by the delay of the response time, the display device of the excellent performance can be achieved.

Further, since the reflective-type display panel is provided additionally and controlled separately from the transmissive-type display panel, the reflective-type display panel of advantage in the bright environment can be effectively used as the main display.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A backlight unit comprising:
   a light guide plate;
   a light source disposed in a side of the light guide plate; and
   a reflective-type display panel disposed on an opposite side of a surface where a light radiated from the light source is extracted, wherein a resolution of the reflective-type display panel is equal to or more than 2×2.

2. The backlight unit of claim 1, wherein the reflective-type display panel is a toner type electronic paper.

3. The backlight unit of claim 2, wherein the toner type electronic paper comprises white toner particles and black toner particles.

4. The backlight unit of claim 1, wherein the light source is at least one of a Cold Cathode Fluorescent Lamp (CCFL), an External Electrode Fluorescent Lamp (EEFL), and a Light Emitting Diode (LED).

5. A display device comprising:
   a backlight unit comprising a light guide plate, a light source disposed in a side of the light guide plate and a reflective-type display panel disposed on an opposite side of a surface where a light radiated from the light source is extracted, wherein a resolution of the reflective-type display panel is equal to or more than 2×2; and
   a transmissive-type display panel disposed in a surface where a light is extracted.

6. The display device of claim 5, wherein a reflective-type display panel is a toner type electronic paper.

7. The display device of claim 6, wherein the toner type electronic paper comprises white toner particles and black toner particles.

8. The display device of claim 5, wherein a resolution of the reflective-type display panel is equal to a resolution of the transmissive-type display panel.

9. The display device of claim 5, wherein a response time of the reflective-type display panel is equal to or faster than a response time of the transmissive-type display panel.

10. The display device of claim 5, wherein the backlight unit allows a scanning driving.

11. The display device of claim 5, wherein at least one of a diffuser plate and a prism sheet is disposed between a light guide plate and the transmissive-type display panel.

* * * * *